United States Patent
Baumgartner et al.

(10) Patent No.: US 10,851,857 B2
(45) Date of Patent: Dec. 1, 2020

(54) DISC BRAKE FOR UTILITY VEHICLES

(71) Applicant: KNORR-BREMSE Systeme fuer Nutzfahrzeuge GmbH, Munich (DE)

(72) Inventors: Johann Baumgartner, Moosburg (DE); Andreas Petschke, Neuburg am Inn (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 0 days.

(21) Appl. No.: 16/296,983

(22) Filed: Mar. 8, 2019

(65) Prior Publication Data
US 2019/0203785 A1    Jul. 4, 2019

Related U.S. Application Data

(63) Continuation of application No. PCT/EP2017/072166, filed on Sep. 5, 2017.

(30) Foreign Application Priority Data

Sep. 9, 2016 (DE) .................. 10 2016 116 967

(51) Int. Cl.
*F16D 55/08* (2006.01)
*F16D 55/226* (2006.01)
(Continued)

(52) U.S. Cl.
CPC ....... *F16D 55/226* (2013.01); *F16D 65/0971* (2013.01); *F16D 65/18* (2013.01); *F16D 2065/026* (2013.01)

(58) Field of Classification Search
CPC .... F16D 65/092; F16D 65/093; F16D 55/226; F16D 55/227; F16D 2125/26; F16D 2125/28
See application file for complete search history.

(56) References Cited

U.S. PATENT DOCUMENTS 4,775,034 A * 10/1988 Pachner .............. F16D 55/227
188/73.45
5,145,037 A    9/1992 Kobayashi et al.
(Continued)

FOREIGN PATENT DOCUMENTS

CN    101033783 A    9/2007
CN    101201085 A    6/2008
(Continued)

OTHER PUBLICATIONS

International Search Report (PCT/ISA/210) issued in PCT Application No. PCT/EP2017/072166 dated Nov. 20, 2017 with English translation (seven pages).
(Continued)

*Primary Examiner* — Nicholas J Lane
(74) *Attorney, Agent, or Firm* — Crowell & Moring LLP

(57) ABSTRACT

A disc brake for utility vehicles includes a brake disc, a brake caliper spanning the brake disc, a brake carrier, and an application-side brake pad and a reaction-side brake pad, of which at least the application-side brake lining is accommodated in a lining slot of the brake carrier. The brake caliper houses a brake application device having a single pressure plunger arranged to exert a brake application force on the application-side brake lining via a pressure plate. The brake is configured with one or both of an operative plane of the pressure plate being offset in the direction of the exit side at a distance from a plane of symmetry of the disc brake, and a bevel on the exit side of at least the application-side brake lining.

21 Claims, 13 Drawing Sheets

(51) Int. Cl.
  *F16D 65/097* (2006.01)
  *F16D 65/18* (2006.01)
  *F16D 65/02* (2006.01)

(56) References Cited

U.S. PATENT DOCUMENTS

| | | | |
|---|---|---|---|
| 5,279,394 A * | 1/1994 | Wollenweber | B60T 8/52 188/1.11 E |
| 5,386,890 A | 2/1995 | Itsuaki | |
| 6,247,561 B1 | 6/2001 | Doi et al. | |
| 6,955,247 B2 * | 10/2005 | Renauld | F16D 55/22 188/250 E |
| 2004/0074710 A1 | 4/2004 | Kloos et al. | |
| 2005/0103582 A1 * | 5/2005 | Lim | F16D 55/227 188/73.45 |
| 2005/0279594 A1 | 12/2005 | Saka | |
| 2007/0209891 A1 * | 9/2007 | Stensson | F16D 65/0979 188/247 |
| 2008/0135353 A1 | 6/2008 | Takeo et al. | |
| 2009/0000893 A1 | 1/2009 | Denys | |
| 2009/0031550 A1 | 2/2009 | Liu et al. | |
| 2009/0145702 A1 * | 6/2009 | Giacomazza | F16D 65/095 188/73.1 |
| 2011/0290599 A1 * | 12/2011 | Vasel | F16D 65/092 188/73.1 |
| 2012/0186918 A1 | 7/2012 | Wakabayashi et al. | |
| 2012/0298456 A1 * | 11/2012 | Morris | F16D 55/226 188/72.4 |
| 2013/0008749 A1 * | 1/2013 | Sandberg | F16D 65/18 188/71.8 |
| 2013/0333991 A1 | 12/2013 | Giese et al. | |
| 2015/0008080 A1 | 1/2015 | Baumgartner et al. | |
| 2017/0307032 A1 | 10/2017 | Beyer et al. | |
| 2018/0017116 A1 * | 1/2018 | Abt | F16D 55/226 |

FOREIGN PATENT DOCUMENTS

| | | |
|---|---|---|
| CN | 102032296 A | 4/2011 |
| CN | 104271978 A | 1/2015 |
| DE | 195 45 744 A1 | 6/1997 |
| DE | 10 2005 028 973 A1 | 2/2006 |
| DE | 10 2009 015 394 A1 | 9/2010 |
| DE | 10 2011 010 912 A1 | 8/2012 |
| DE | 10 2014 017 715 A1 | 6/2016 |
| EP | 1 396 652 B1 | 5/2006 |
| EP | 2 392 835 B1 | 7/2013 |
| FR | 2 312 690 A1 | 12/1976 |
| JP | 5-501446 A | 3/1993 |
| JP | 6-16733 U | 3/1994 |
| JP | 7-27153 A | 1/1995 |
| JP | 2000-46076 A | 2/2000 |

OTHER PUBLICATIONS

German-language Written Opinion (PCT/ISA/237) issued in PCT Application No. PCT/EP2017/072166 dated Nov. 20, 2017 (eight pages).

German-language Office Action issued in counterpart German Application No. 10 2016 116 967.6 dated Jun. 8, 2017 (eight pages).

International Preliminary Report on Patentability (PCT/IB/373) issued in PCT Application No. PCT/EP2017/072166 dated Mar. 12, 2019, including English translation of document C2 (German-language Written Opinion (PCT/ISA/237) previously filed on Mar. 8, 2019) (nine (9) pages).

Chinese-language Office Action issued in counterpart Chinese Application No. 201780062543.8 dated Dec. 6, 2019 with English translation (11 pages).

Japanese-language Office Action issued in Japanese Application No. 2019-510455 dated Jul. 22, 2020 with English translation (eight pages).

\* cited by examiner

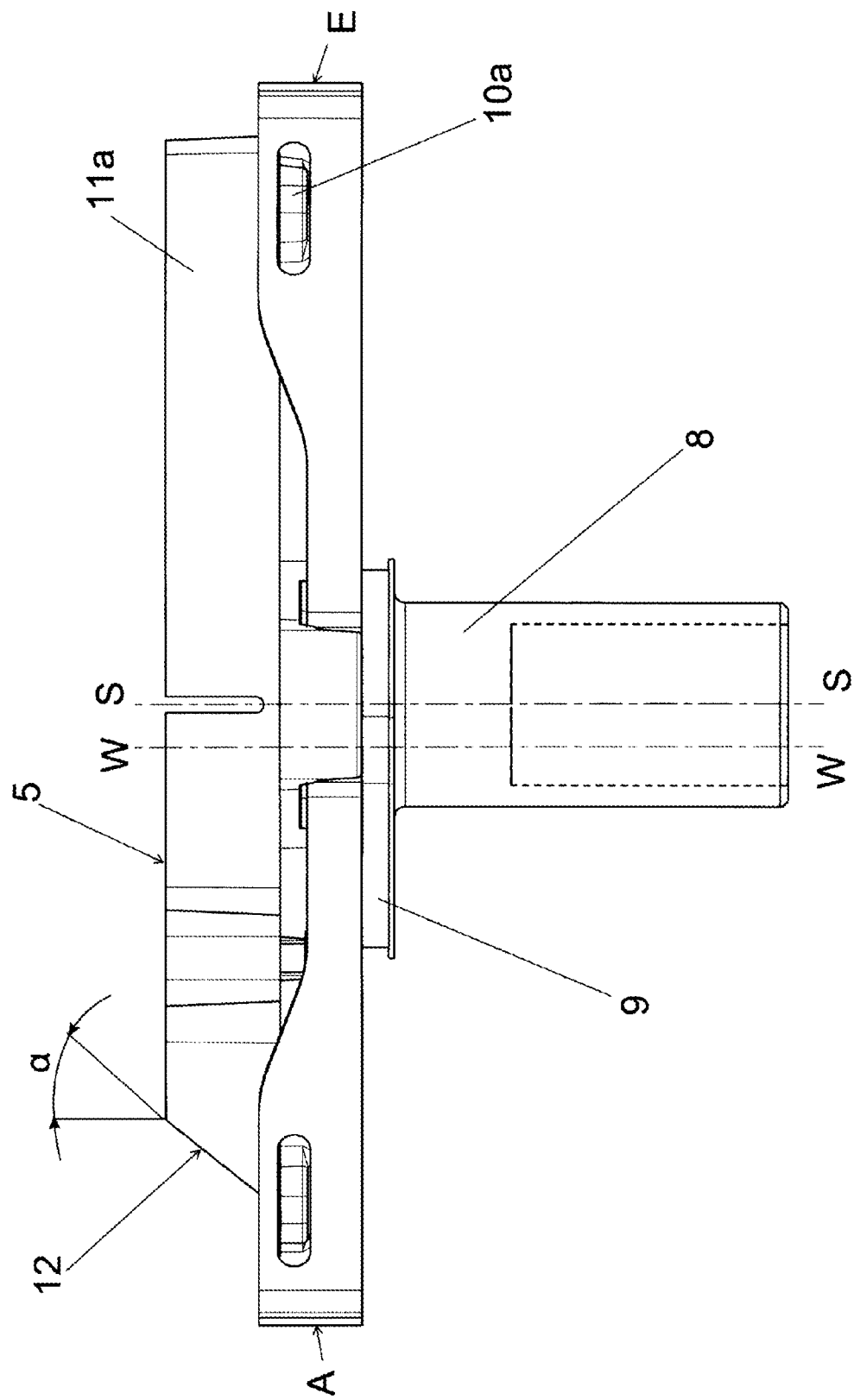

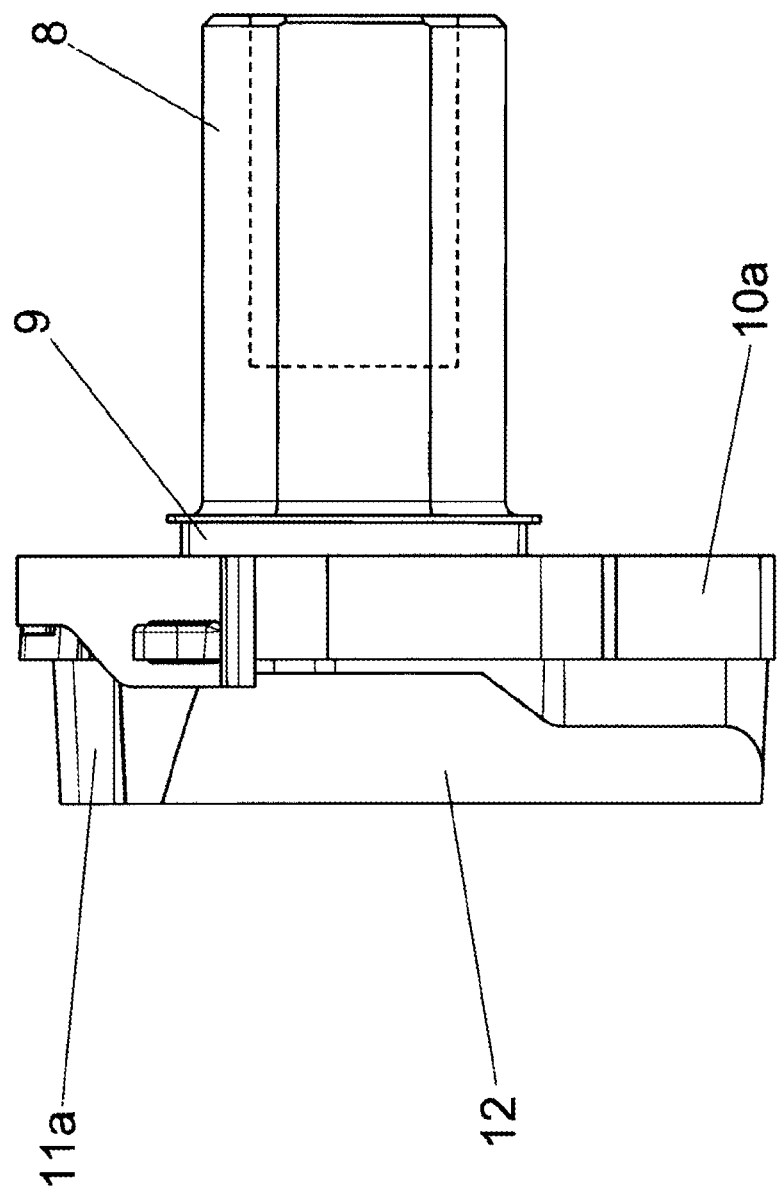

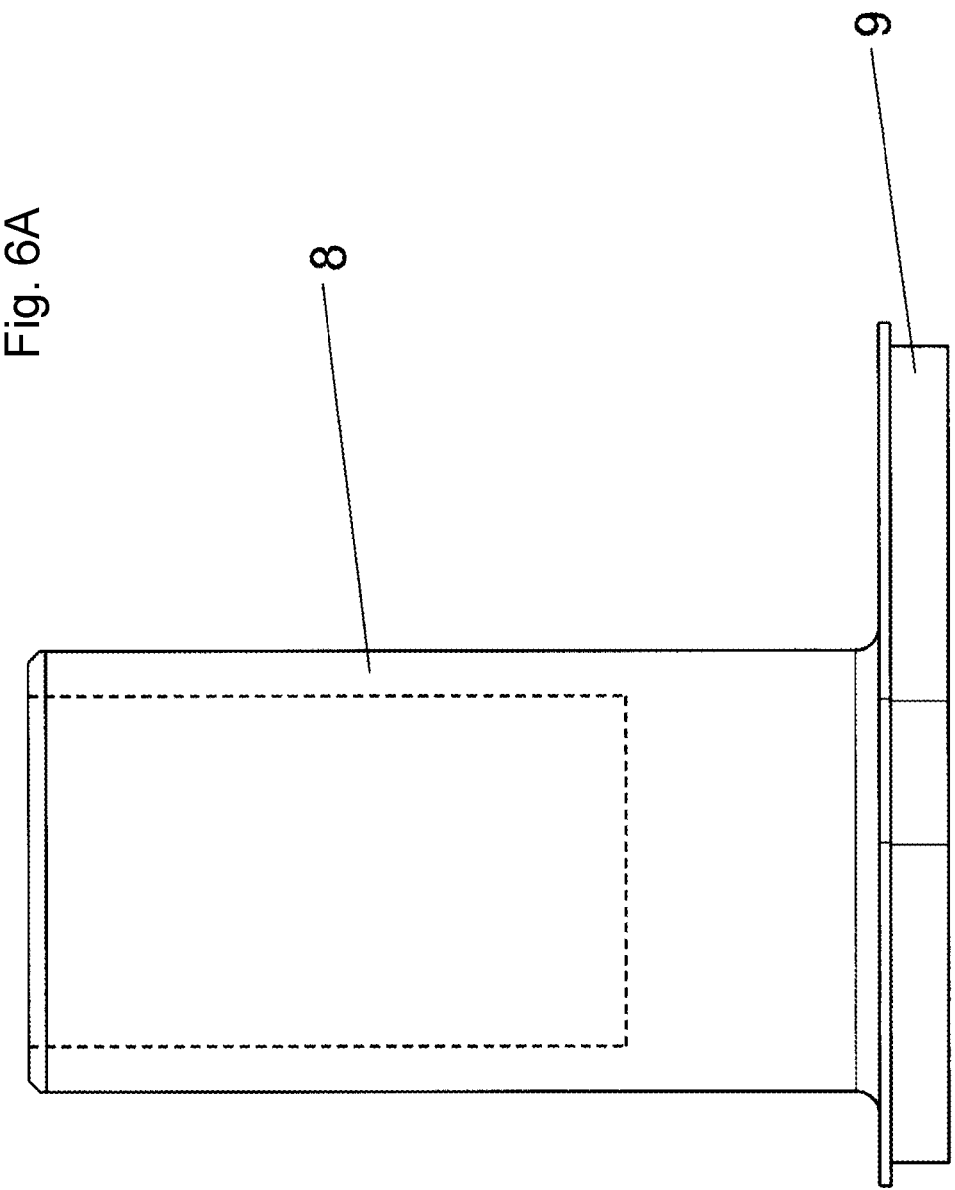

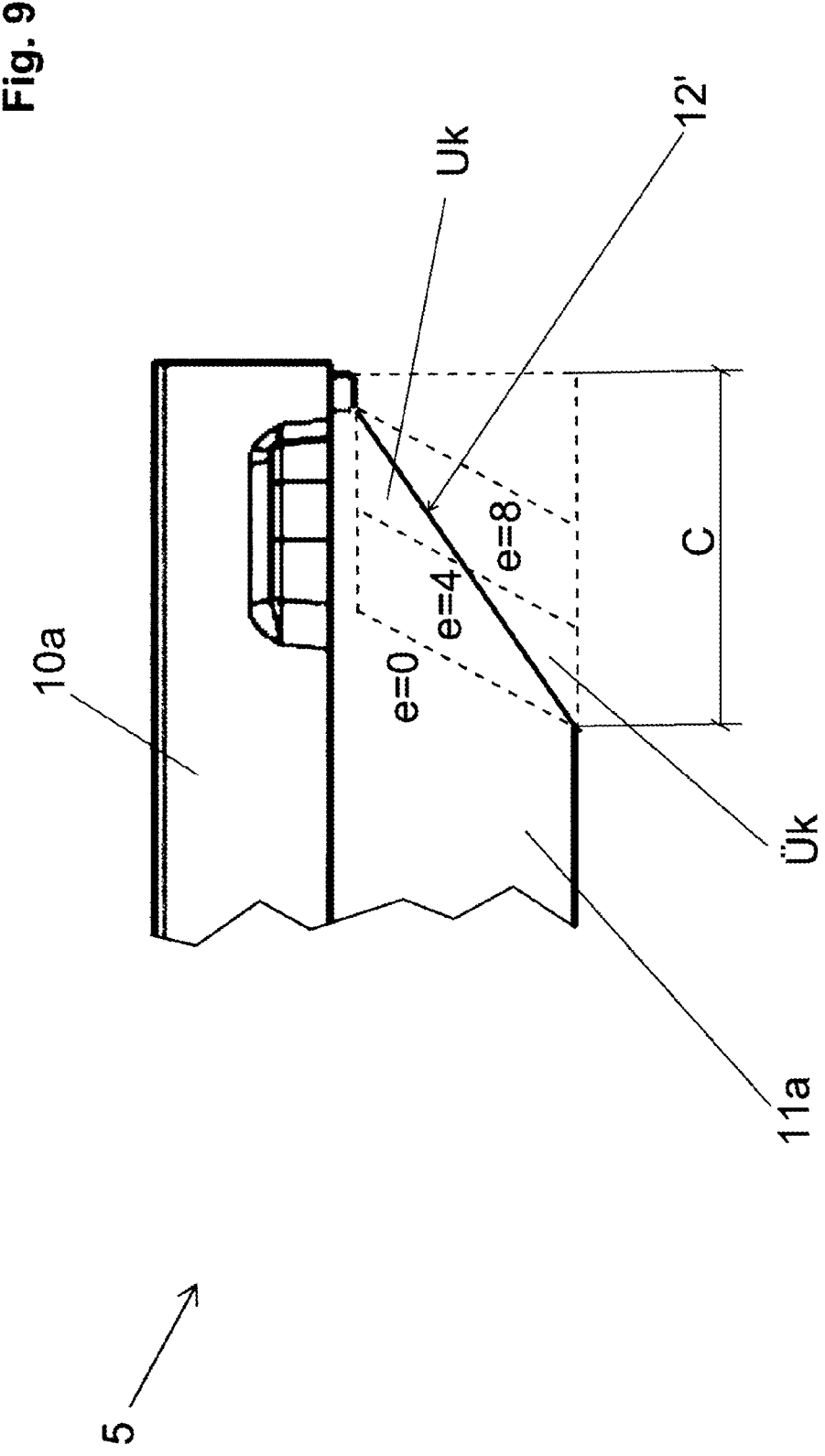

DISC BRAKE FOR UTILITY VEHICLES

CROSS REFERENCE TO RELATED APPLICATIONS

This application is a continuation of PCT International Application No. PCT/EP2017/072166, filed Sep. 5, 2017, which claims priority under 35 U.S.C. § 119 from German Patent Application No. 10 2016 116 967.6, filed Sep. 9, 2016, the entire disclosures of which are herein expressly incorporated by reference.

BACKGROUND AND SUMMARY OF THE INVENTION

The present invention concerns a disc brake.

In the text below, the brake pad on the side of the application device of the disc brake is described as the "application-side brake pad" and the brake pad on the side facing away from the application mechanism is described as the "reaction-side brake pad". With reference to the rotation direction of the brake disc on forward travel of the motor vehicle on which such a brake disc is mounted, a distinction is made between the entry side—i.e. the side of the brake caliper on which the brake disc runs into or turns into the brake pad bearing thereon during braking—and the exit side—i.e. the side of the brake caliper at which the brake disc runs out of the applied brake pad.

It is known that in disc brakes for motor vehicles, because of the mechanical properties of the system "disc brake with brake disc on the axle of the vehicle", an uneven brake pad wear occurs, also known as tangential diagonal wear on the brake pads. This applies in particular to disc brakes for utility vehicles with an application device in which a single central piston is provided for exerting an application force on a brake pad.

This uneven, tangential diagonal wear—referred to below simply as "diagonal wear"—is caused by various effects. These include self-amplifying effects, friction in a pad guide in a brake carrier, elastic deformation of the brake caliper/frame, and or non-optimal conditions of the transfer of application force to the brake pad.

These effects individually and in combination lead to an uneven distribution of pressure in the friction surface of the brake pad and result in uneven wear on the application-side brake pad. Uneven wear of one or both pads leads to a reduction in the usage duration of the brake pad, and hence to increased service costs.

When the brakes are actuated, if the brake pad is worn unevenly in this way, firstly the less worn region of the brake pad comes into contact with the brake disc, which leads to a premature stoppage of the adjustment process and hence to a non-fully optimal adjustment process. Due to the uneven wear on the brake pads, also the setting of an air gap on a disc brake is adversely affected, which normally leads to an increase in the air gap and hence to an extension of the reaction time of the disc brake.

To avoid undesirable diagonal wear on the brake pads of such disc brakes for utility vehicles, various possible solutions are known from the prior art.

EP 1 396 652 B1 describes a compressed air actuated disc brake for utility vehicles which has a brake caliper guided movably on a brake carrier, and an application device with a single piston which, on braking, due to application of the disc brake, acts on the application-side brake pad and presses this against the rotating brake disc. During application, the reaction-side brake pad with the moving brake caliper is also drawn onto the brake disc. To prevent diagonal wear, the reaction-side brake pad is arranged eccentrically relative to the piston in the direction of the brake disc exit. Furthermore, optionally it is provided that the reaction-side brake pad has a wedge shape.

The disadvantage of this solution is the increased installation space required due to the offset of the brake pad cavity of the brake carrier in the circumferential direction. In addition, a wedge-shaped brake pad has a significantly reduced contact area on the brake disc over its entire service life.

EP 2 392 835 B1 discloses a compressed air actuated disc brake for utility vehicles which has a floating caliper configured as a frame, and fits over an upper edge of the brake disc in the manner of a frame. The brake caliper furthermore comprises an application device with a single piston and a brake carrier. To prevent diagonal wear, the application-side brake pad is arranged eccentrically relative to the piston in a brake carrier which is offset towards the brake disc exit in the circumferential direction.

The disadvantage of this solution is that, to implement the solution with an offset pad cavity, greater structural complexity is required and increased installation space in the circumferential direction is necessary in order to guarantee the desired function.

FR 2 312 690 A describes a disc brake for a car. To avoid brake noise, e.g. brake squeal, at least one brake pad of the disc brake is unilaterally chamfered on the entry side.

DE 10 2011 010 912 A1 furthermore discloses providing a bevel, known as a chamfer, on the exit side of an application-side brake pad. According to DE 10 2011 010 912 A1, two chamfers are arranged symmetrically to the brake pad, wherein the chamfers have preferably convexly curved chamfer edges. Also, this brake pad has two tabs protruding laterally in the circumferential direction, by means of which it is suspended in a guide cavity of a disc brake arrangement.

The object of the present invention is to indicate a disc brake for utility vehicles with an application device, which has a single piston and at least partially eliminates the disadvantages of the prior art. It is provided that A) an action plane of the pressure plate has a center offset in the direction of the exit side at a distance from the central plane of the disc brake, and/or B) at least the application-side brake pad has a bevel on the exit side.

In this way, one or both measures A) and $B_1$) combined serve to compensate for the diagonal wear of the brake pads, in the latter case divided over two components of the brake disc so that each of these components need only provide part of the necessary amount of compensation for the diagonal wear and may be configured accordingly.

According to a preferred variant of the invention, the reaction-side brake pad has a bevel on the exit side. Compensation for diagonal wear can be achieved fully or partially thereby. In this way, an additional center offset of the piston and the bevel on the application-side brake pad may advantageously be configured smaller.

In a further preferred embodiment variant of the invention, the pressure plate has a non-circular, preferably oval, geometry. In this way, a compact piston which acts with a defined center offset can be produced easily.

According to a further variant, as a measure C) it is provided that an entry-side shoulder of the application-side carrier plate of the application-side brake pad engages in an entry-side recess of the brake carrier. In this way too, a diagonal wear of the application-side brake pad is countered.

The corrective measures A), $B_1$) and/or C) are advantageous independently of each other or individually, but may also complement each other to give a desired correction behavior. Suitable settings and designs of the one, two or three measures A) and/or $B_1$) and/or C) can be found by experiment by the person skilled in the art.

A part of measures A) and C) is fixedly established in amount for the respective disc brake. The other part of the measures (here e.g. measure $B_1$) is variable and may be adapted according to the wear state of the brake pad.

Thus with a combination of measures, it is advantageously and simply also possible to compensate for causes of diagonal wear which are dependent on pad thickness or independent of pad thickness. In this way, the eccentric offset of the pressure plate may advantageously be made smaller than without the bevel.

Due to the exit-side bevel of the friction lining, which could also be considered an independent variant of the invention, a variable correction moment is created because of the distance between the centroid of the carrier plate and the action plane of the pressure plate, which distance increases depending on the thickness of the friction lining, due to a shift of the centroid of the friction lining against the rotation direction of the brake disc. Thus, in a simple and hence advantageous fashion, the friction lining is configured such that it makes a defined contribution to compensation for diagonal wear.

According to a further preferred embodiment variant of the invention, the bevel (measure $B_2$) is configured such that when the friction lining is still unworn, an over-compensation for the tangential diagonal wear is made which reduces with diminishing thickness of the friction lining and transforms into an under-compensation from a medium thickness of the friction lining. In this way, in a simple and advantageous fashion, an even wear is achieved without diagonal wear of the friction lining.

In a further preferred embodiment variant of the invention, part of the bevel serves for at least partially compensating for the servo effect, while another part compensates at least partially for the effect of the friction force of the carrier plate on the brake carrier. In this way, the bevel may be easily and advantageously adapted in a defined fashion to the requirements of the respective disc brake.

Insofar as the description below refers to the center offset of the piston 8, this means the distance of the action plane W of the piston 8 from the central plane S of the disc brake 1, which is caused by the offset of the centroid of the pressure plate 9 relative to the plane of symmetry of the piston 8.

In a further preferred embodiment variant of the invention, the distance between the action plane W of the piston and the central plane S of the disc brake lies between e=0 mm and e=10 mm, preferably between e=2 mm and e=4 mm. This advantageously gives a compact design despite the offset of the force application point on the pressure plate.

It may furthermore advantageously be provided that the bevel of the friction lining in a direction parallel to the brake disc rotation axis does not end at the exit-side edge of the carrier plate but ends spaced therefrom, preferably such that the distance corresponds to the residual friction lining thickness. The latter measure itself creates a simple possibility for visual inspection of the pad wear.

According to a further variant, it may be provided that the bevel of the friction lining in the circumferential direction parallel to the brake disc does not end at the exit-side edge of the carrier plate, which is otherwise designed preferably symmetrical to the central plane, but is spaced therefrom. This measure too may additionally counter a diagonal wear.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5A a top view of the piston and the application-side brake pad from FIG. 3.

FIG. 5B a side view of the piston and the application-side brake pad from FIG. 3.

FIG. 6A a top view of the piston from FIG. 3.

FIG. 9 a further enlarged view of the exit side of the application-side brake pad from FIG. 3.

DETAILED DESCRIPTION OF THE DRAWINGS

Figure 1:
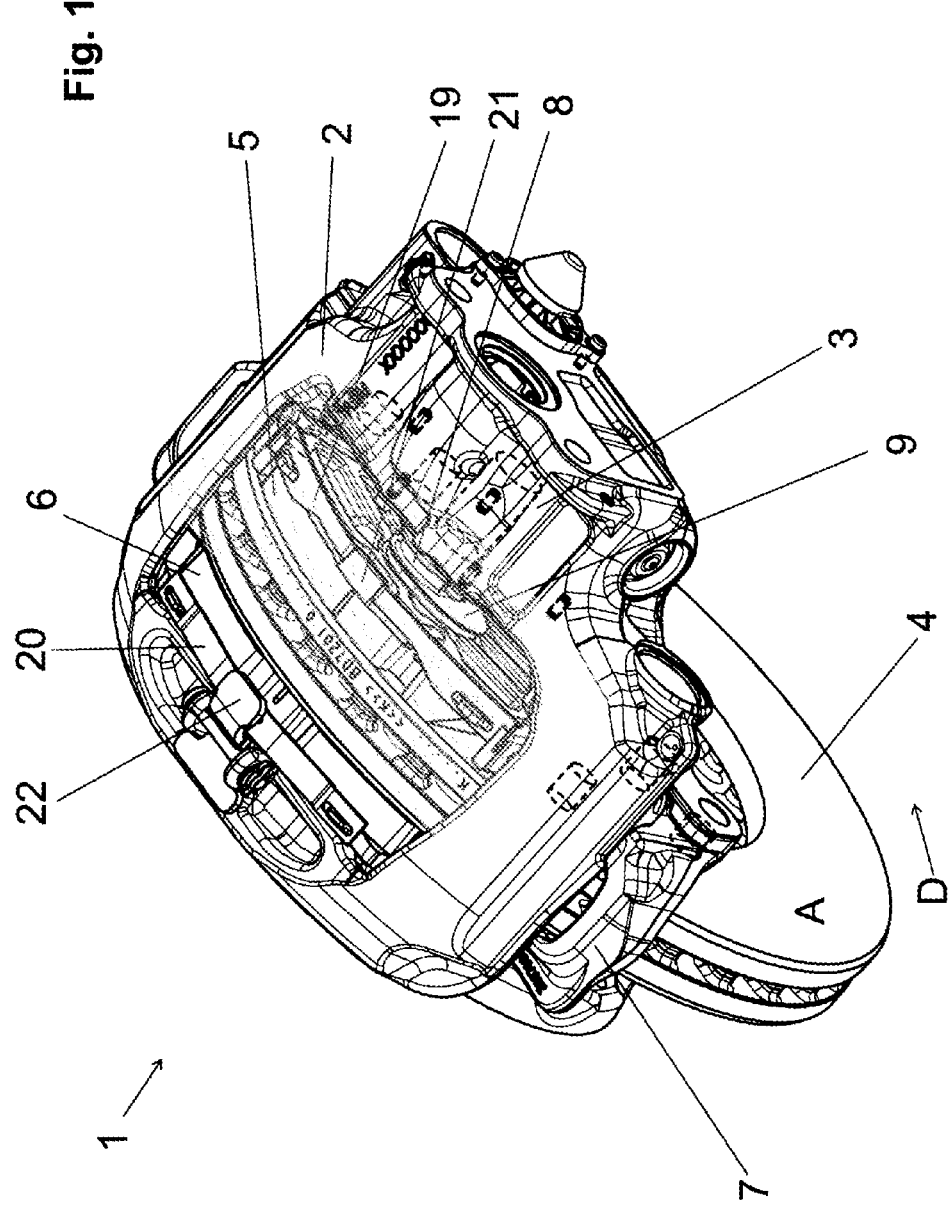
FIG. 1 a spatial view of a disc brake according to an embodiment of the invention.

FIG. 1 shows a view of a disc brake 1 for a utility vehicle, with a brake caliper 2 which fits over a brake disc 4, and in which brake pads 5, 6 are positioned which can be pressed against the brake disc 4 on braking.

The brake caliper 2 is here configured as a floating or sliding caliper. Alternatively, the disc brake 1 may also be configured as a fixed caliper brake. The brake caliper 2 fits—in the manner of a frame—over a brake disc 4 which can rotate during driving of a vehicle equipped with the disc brake 1.

On braking, the application-side brake pad 5 and the reaction-side brake pad 6 act on the brake disc 4, wherein the reaction-side brake pad 6 is preferably arranged symmetrically to the plane of the brake disc 4 relative to the application-side brake pad 5.

The brake pads 5, 6 are also arranged in the disc brake 1 so as to be substantially symmetrical relative to a central plane S of the disc brake 1. Here, they are inserted in a brake carrier 7 and guided in cavities of this brake carrier 7 on both sides of the brake disc 4. The reaction-side brake pad 6 could also be inserted directly in a pad cavity of the brake caliper 2 in the case where the brake carrier 7 is provided on only one side of the brake disc 4 (not shown here).

The brake carrier 7 fits over a circumferential edge region of the brake disc 4 in the manner of a frame. The application device of the disc brake 1 has a single piston 8. The piston 8 is displaceable parallel to the rotation axis of the brake disc 4 and here guided so as to prevent twisting.

In the configuration as a floating caliper disc brake, as shown as a particularly preferred but not mandatory embodiment in FIG. 1, the brake caliper 2 is guided movably on the brake carrier 7. For this, two guide bearings 15, 16 (see FIG. 1) are provided which are formed between the brake caliper 2 and the brake carrier 7 and extend parallel to the brake disc rotation axis. The brake disc rotation axis lies on a central plane S which is formed as an axis of symmetry such that each of its surface points is equally remote from points which lie on the straight lines F1, F2 running centrally through the middle of the guide bearings 15, 16 (see FIG. 2).

Figure 2:
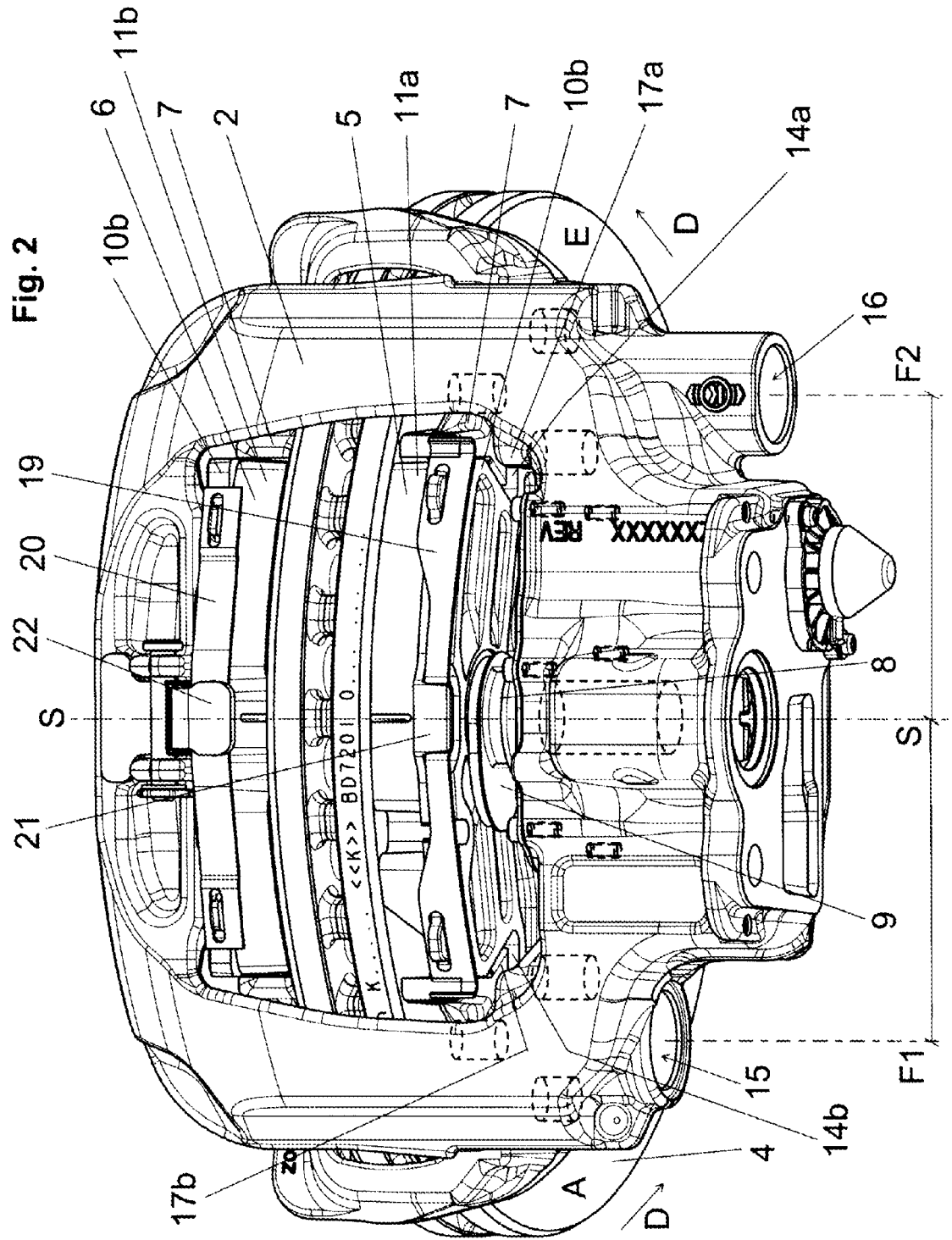
FIG. 2 a further spatial view of the disc brake from FIG. 1.

The application-side brake pad 5 and the reaction-side brake pad 6 each have a friction lining 11$a$, 11$b$ which is applied to a respective carrier plate 10$a$, 10$b$ and connected thereto (see also FIG. 2).

Figure 3:
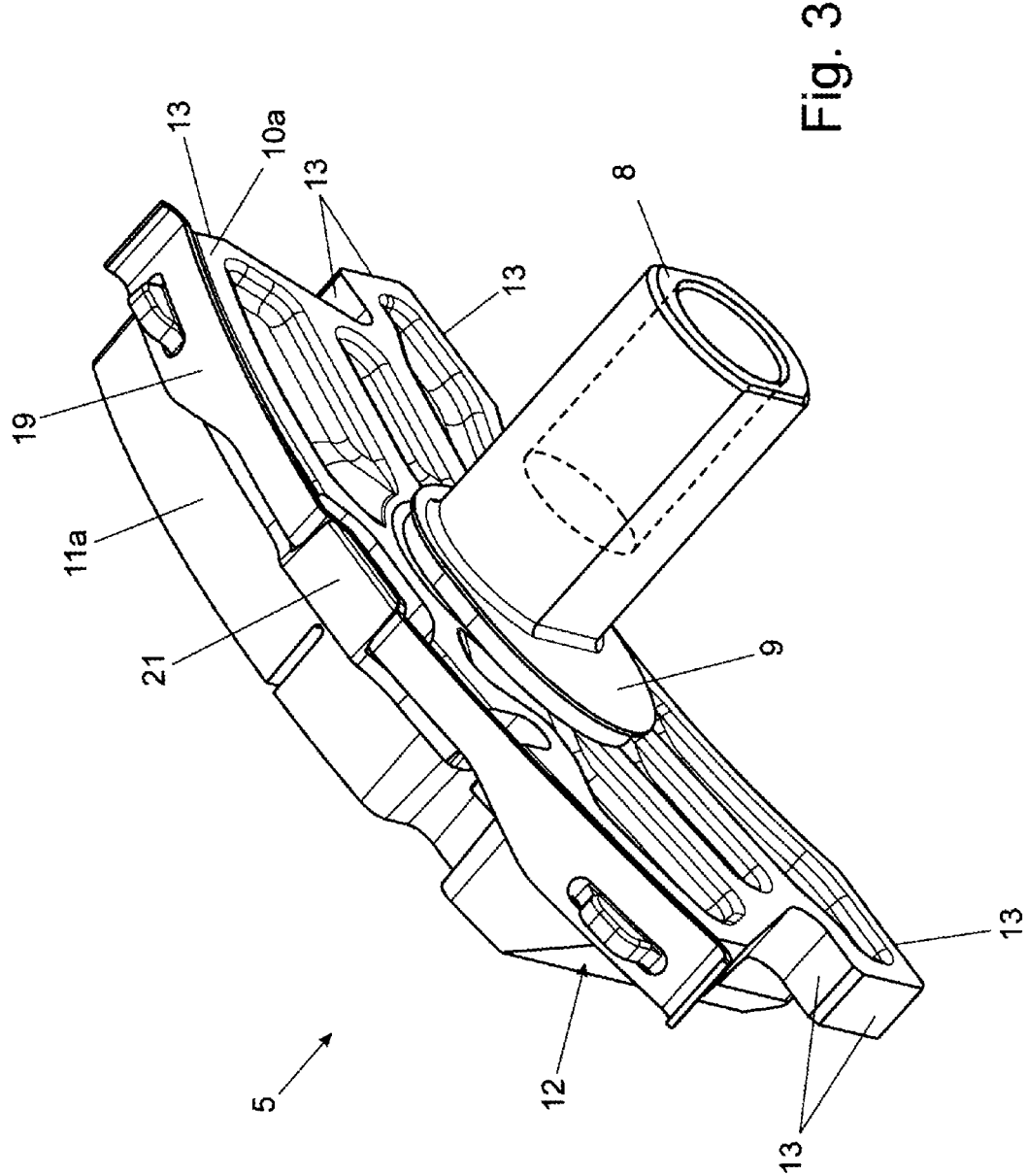
FIG. 3 a spatial view of the piston and the application-side brake pad of the disc brake from FIG. 1.
Figure 4:
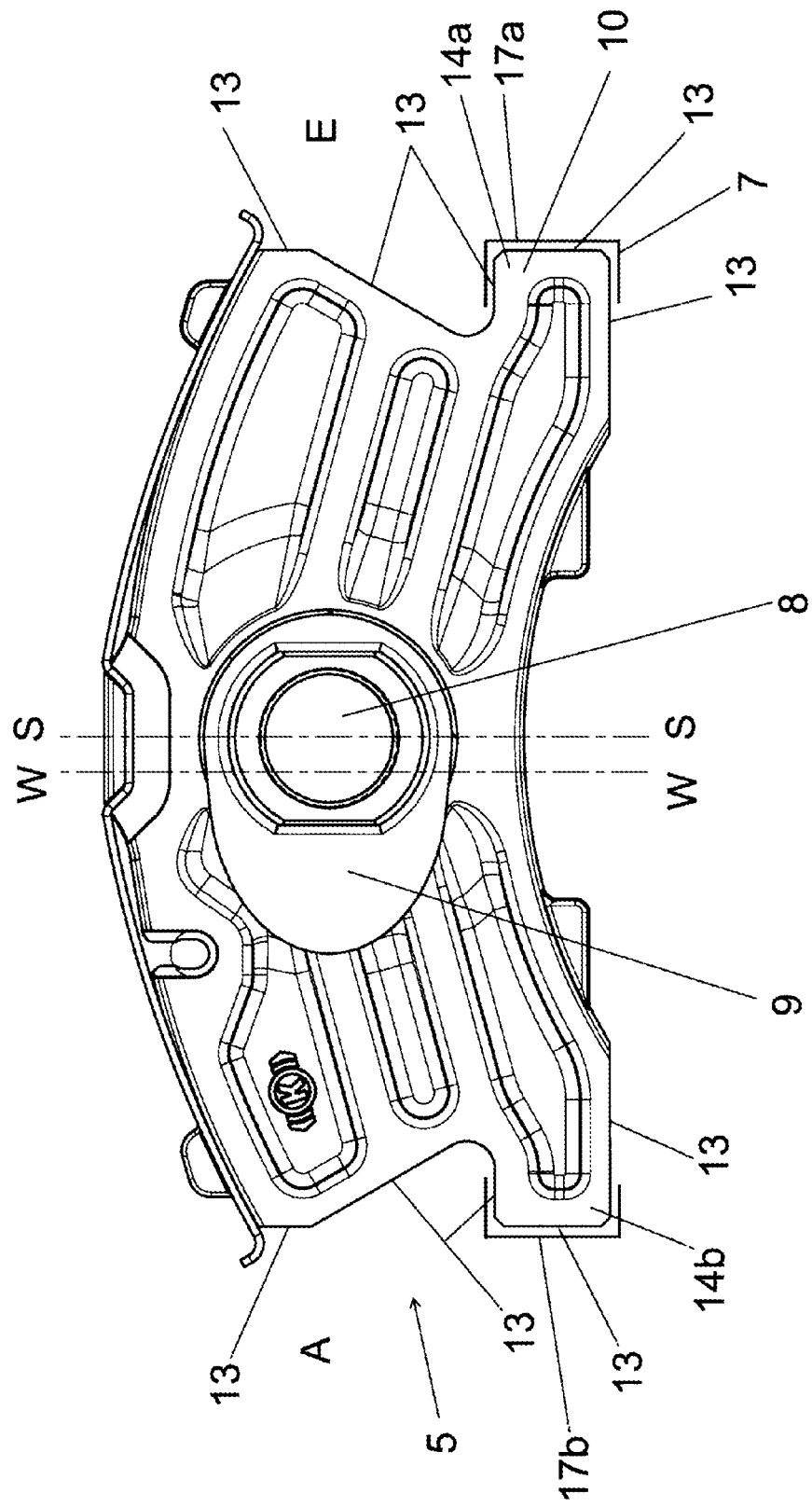
FIG. 4 a front view of the piston and the application-side brake pad from FIG. 3.

According to FIG. 3 and FIG. 4, each of these carrier plates 10$a$, 10$b$ has guide faces 13 on which the reaction-side brake pad 6 is movably guided in the brake carrier 7. The reaction-side brake pad 6 also has a friction lining 11$b$ which is connected by substance bonding to the carrier plates 10$b$.

The guide faces 13 are all faces of the carrier plates 10$a$, 10$b$ which guide the application-side brake pad 5—and here accordingly the reaction-side brake pad 6—movably parallel to the brake disc axis in the brake carrier 7.

The carrier plates 10$a$, 10$b$ of the application-side brake pad 5 and the reaction-side brake pad 6 may be designed identically or differently. Furthermore, they are each formed symmetrically relative to the plane of symmetry S.

The brake caliper 2 has a housing portion 3 which houses an application device, i.e. a multipiece means, in particular a mechanism, for applying the disc brake 1 (not shown here). The housing portion 3 is here configured integrally with the brake caliper 2. The disc brake 1 is here designed for a fluidic, in particular pneumatic actuation. Alternatively, an electrical or electromechanical actuation of the disc brake 1 is possible.

The piston 8 is also guided displaceably in the central plane S of the disc brake 1 or in the central plane of the housing 3 of the application device in the housing portion 3. On its side facing the application-side brake pad 5, it has a pressure plate 9.

On braking with a disc brake 1 which is configured as a floating caliper disc brake, the application device acts with the single piston 8 and the pressure plate 9, which due to application of the disc brake 9 acts on the application-side brake pad 5 and presses this against the rotating brake disc 4. On application, the reaction-side brake pad 6 is furthermore pulled against the brake disc 4 with the moving brake caliper 2 on the other side of the brake disc 4.

Figure 6B:
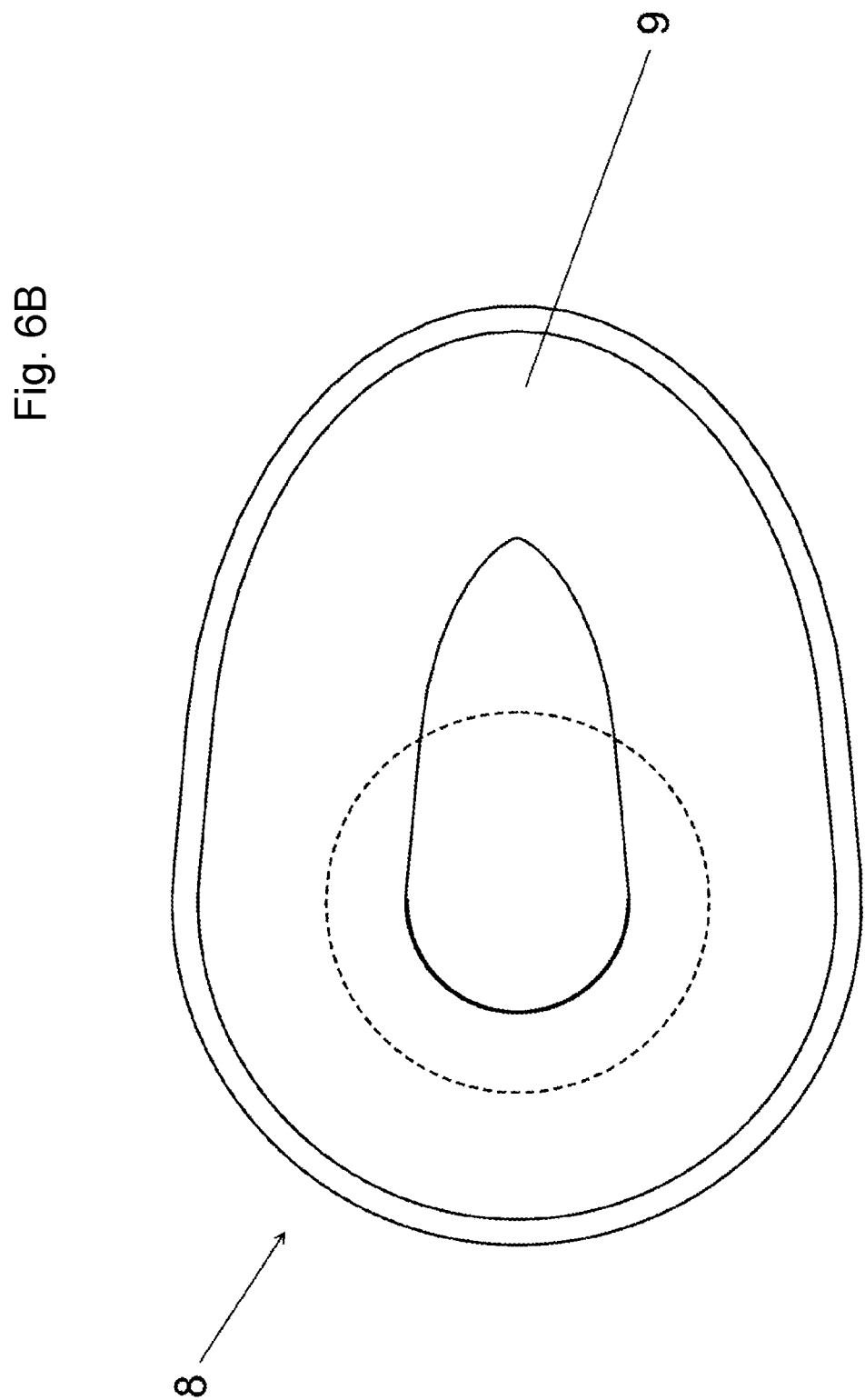
FIG. 6B a front view of the piston from FIG. 3.
Figure 6C:
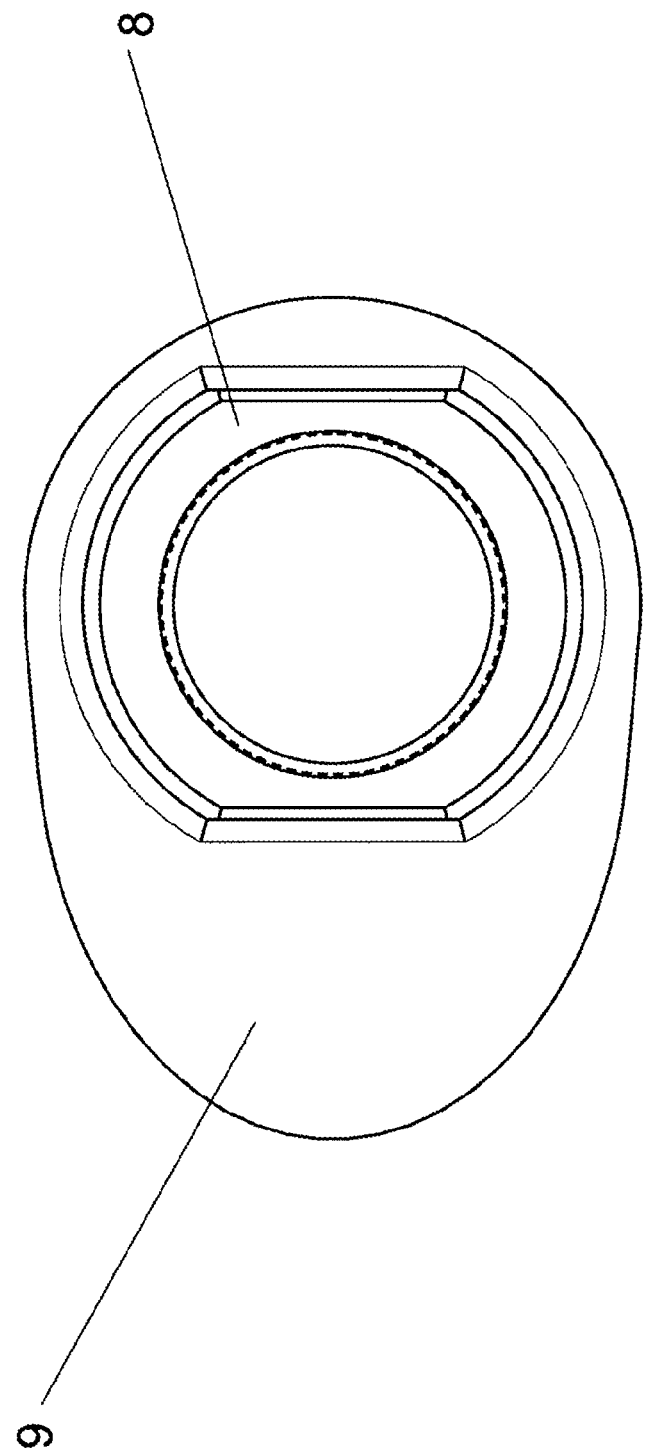
FIG. 6C a rear view of the piston from FIG. 3.

FIG. 6A, and in particular FIGS. 6B and 6C, clearly show that the pressure plate 9 of the piston 8 has a geometry which is asymmetric relative to the central plane S, i.e. here not circular but advantageously oval. The pressure plate 9 and the piston 8 may advantageously be configured integrally. However, a configuration in two or more parts is also conceivable.

FIG. 2 clearly shows that the pressure plate 9—here the oval pressure plate 9 or oval—is offset unilaterally relative to the central plane S of the disc brake 1 in the direction of the exit side A of the brake disc 4. This gives a centroid of the pressure plate 9 which lies outside the central plane S of the disc brake 1, so that the action plane W of the piston 8 on the application-side brake pad 5 is shifted in the direction of the exit side A of the brake disc 4.

The piston 8 thus acts outside the central plane S of the disc brake 1 on the application-side brake pad 5 (see also FIG. 4). The pressure plate 9 and the piston 8 as a whole may also form one body which has a non-circular, asymmetrical cross-sectional geometry.

Because of measure A): "a pressure plate 9 of the piston 8 acting asymmetrically relative to the central plane S of the disc brake 1", advantageously and with little complexity, again a partial amount of the diagonal wear otherwise resulting in operation of the disc brake 1 is compensated.

FIG. 2 clearly shows the pressure plate 9 acting asymmetrically on the application-side brake pad 5. It also clearly shows the substantially symmetrical structure of the disc brake 1.

FIG. 3 shows the piston 8 with the pressure plate 9 and the application-side brake pad 5 separately, without adjacent components of the disc brake 1.

The carrier plate 10$a$ of this brake pad 5, on its side facing the piston 8 or pressure plate 9, has several pocket-like depressions so that its surface forms ribs.

FIG. 4 clearly shows that the centroid of the pressure plate 9—i.e. the action plane W of the pressure plate 9—lies outside the central plane S of the disc brake 1. Therefore the force with which the piston 8 acts on the carrier plate 10$a$ of the application-side brake pad 5 acts eccentrically relative to the central plane S of the disc brake 1.

FIGS. 5A and 5B show that the friction lining 11$a$ of the application-side brake pad 5 is beveled on the exit side A of the application-side brake pad 5 (relative to the preferred rotation direction of the disc brake 4 in forward travel). A chamfer or bevel 12 is formed. This bevel 12 is preferably arranged at an acute angle alpha of preferably between 10° and 30°, particularly preferably between 15° and 25° to the brake disc rotation axis and to the central plane S. No such chamfer is formed on the entry side E. The friction lining 11$a$ on the entry-side edge is here oriented parallel or approximately parallel to the central plane S.

Due to the exit-side bevel 12 of the friction lining 11$a$, the centroid of the friction lining 11$a$ is shifted in the direction of the entry side E of the application-side brake pad 5, so that the friction lining 11$a$ acts eccentrically relative to the central plane S of the disc brake 1.

Because of measure $B_1$): "an exit-side bevel 12 of the friction lining 11$a$ of the application-side brake pad 5", again a correction moment is produced. The correction moment occurs because of the shift of the centroid of the friction lining 11 relative to the action plane W of the pressure plate 9 on the carrier plate 10. The bevel 12 serves to compensate for or balance the wear-induced change in thickness of the friction lining 11 and the resulting change in the servo moment $M_S$. Due to the bevel 12, the centroid of the friction lining 11 in its new state is furthest offset from the action plane of the pressure plate 9. As the thickness of the friction lining 11 diminishes due to wear, the centroid of the friction lining 11 migrates successively in the direction of the action plane W of the pressure plate 9 on the carrier plate of the brake pad 5.

According to a preferred embodiment of the disc brake 1, which is not however mandatory for any embodiment, the carrier plate 10$a$ of the application-side brake pad 5 here has two lateral shoulders 14$a$, 14$b$ extending in the circumferential direction, which engage in corresponding recesses 17$a$, 17$b$ of the brake carrier 7 (see FIG. 2 and FIG. 4 in which the recesses are indicated; they extend perpendicular to the image plane of FIG. 4).

One of the shoulders 14a is formed on the entry side of the carrier plate 10a and the other shoulder 14b on the exit side. On braking in forward travel, the entry-side shoulder 14a acts as a support element so that part of the brake force is transferred to the brake carrier 7 via the shoulder 14a.

The application-side brake pad 5 and the reaction-side brake pad 6 furthermore each have a spring 19, 20 on the upper edge. The spring 19 of the application-side brake pad 5 passes through an undercut lying on the pad carrier plate 10a which is covered by a web 21 so as to form a type of groove in which the spring 19 engages. The spring 20 of the reaction-side brake pad 6 is retained by a retaining bracket 22, which is fixed at one end on the brake caliper 2 and extends axially only over the reaction-side brake pad 6 and not over the application-side brake pad 5, and is provided with the shoulders 14a, 14b as security against radial loss. Thus the application-side brake pad 5 and the reaction-side brake pad 6 are here arranged and secured on the brake disc 1 in a structurally simple and secure fashion.

Because of measure C) "an entry-side shoulder 14a of the application-side carrier plate 10a of the application-side brake pad 5 engages in an entry-side recess 17a of the brake carrier 7", again a diagonal wear of the application-side brake pad 5 is countered.

The carrier plate 10b of the reaction-side brake pad 6 also has a geometry which is substantially symmetrical relative to the central plane S (see also FIG. 4). Here it has no shoulders 14, but may optionally be provided therewith. The carrier plates 10a, 10b are preferably made of a metal, in particular a cast-iron material.

Measures A) and/or $B_i$) and/or C) for compensating for diagonal wear are advantageous independently of each other or individually, but also are complementary if provided together and therefore adapted to each other such that, as a whole, they combine to provide a desired correction behavior. Suitable adaptations and configurations of the one, two or three measures A), $B_1$) and C) may be found by experiment by the person skilled in the art.

With a combination of these measures A), $B_1$) and C), it is also advantageously possible to compensate for causes of diagonal wear which are dependent on pad thickness or independent of pad thickness.

The eccentric offset of the pressure plate 9 may thus advantageously be formed smaller than without the bevel 12.

With regard to measure $B_1$), further advantageous embodiments have been found which also constitute an independent invention.

It is advantageous, when the friction lining 11a of the application-side brake pad 5 is still unworn, to provide firstly an over-compensation for diagonal wear which reduces with diminishing thickness of the friction lining 11a and transforms into under-compensation from a medium thickness of the friction lining 11a.

This advantageous embodiment of the bevel 12' also allows the deviation from the ideal state to be kept relatively low, and in particular in the case of a fully worn friction lining 11a, an even thickness of the remaining friction lining 11a may be achieved.

Technical conditions of this measure $B_2$) as an advantageous refinement of measure $B_1$) are described in detail below. Also, further advantages and designs of measures $B_1$) and/or $B_2$) are indicated.

The exit-side bevel 12 of the friction lining 11a of the application-side brake pad 5 causes a reduction in the active surface area on the exit side A of the brake pad 5.

By maintaining a center offset of the pressure plate 9 of the piston 8, the surface pressure of the friction lining 11a on the exit side A is increased and the surface pressure on the entry side E of the application-side brake pad 5 is reduced.

In this way, compensation is possible for the two effects causing the diagonal wear. An explanation of the two effects X) and Y) is illustrated in FIG. 7 and given in the statements below.

The bevel 12 of the friction lining 11a made preferably only on the exit side entails the advantage that the effect which counters the diagonal wear diminishes as the thickness of the friction lining 11a reduces. This measure is thus suitable for compensating for a "servo effect" which is also dependent on the thickness of the friction lining 11a or brake pad 5.

The term "servo effect"—or effect X)—in the context of this publication means a torque, the amount of which results from the interaction of the circumferential force $F_U$ of the brake disc 4 with a lever arm H, wherein the amount of the lever arm H results from the thickness of the friction lining 11a of the application-side brake pad 5 and half the thickness of the carrier plate 10a of the application-side brake pad 5. The amount of this torque $M_S$ is dependent on the height H, which reduces due to wear, of the brake pad 5 (see also FIG. 7).

Figure 7:
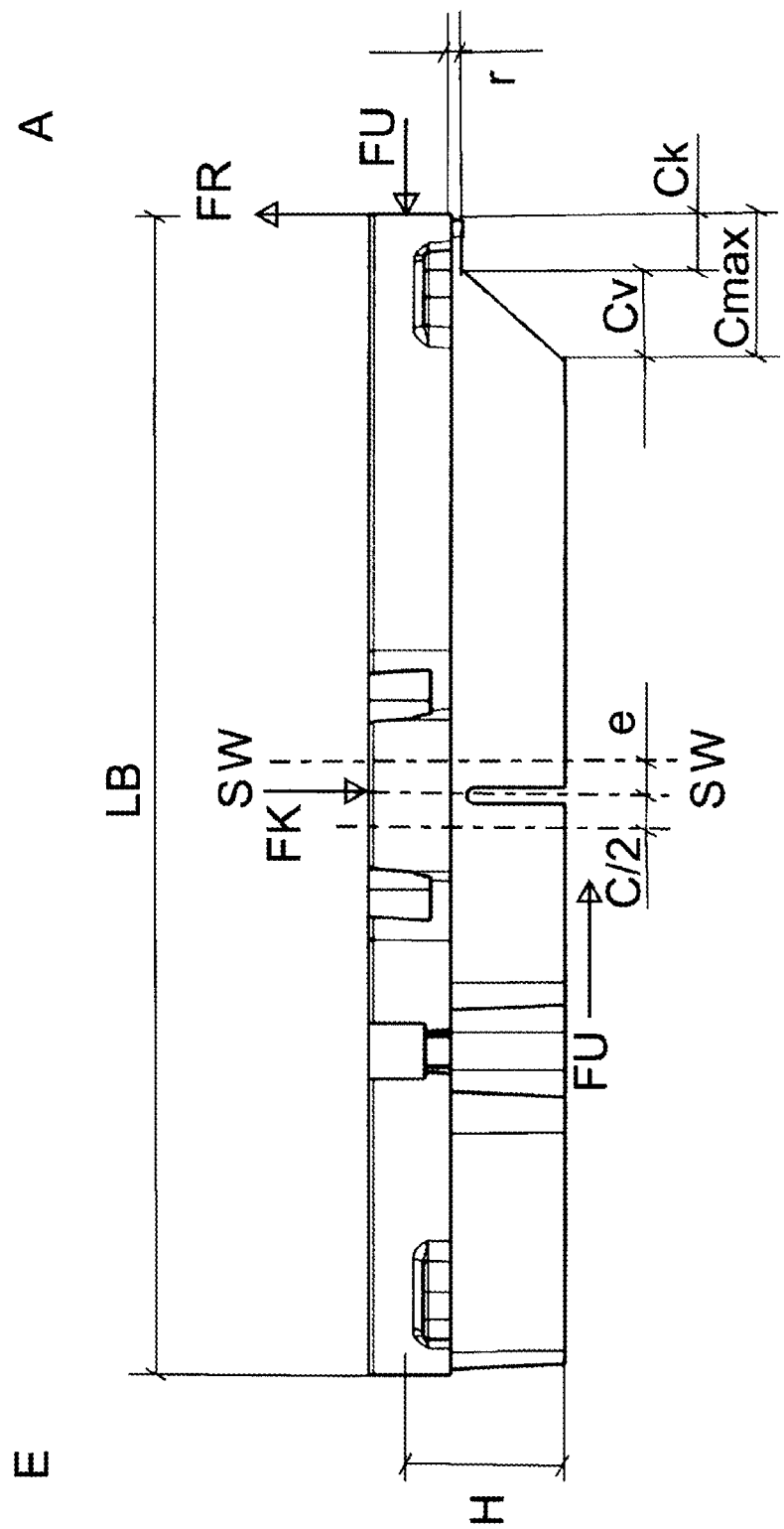
FIG. 7 a top view of the application-side brake pad from FIG. 3.

The second influence causing the diagonal wear of the brake pads 5, 6, or effect Y)—namely the friction force $F_R$ occurring at the guide faces 13 of the carrier plate 10a and directed against the application force $F_K$ of the disc brake 1, and the resulting friction moment $M_R$—is not connected with the thickness of the friction lining 11a and is dependent exclusively on the actuation force $F_K$ and the coefficients of friction μS between the guide faces 13 of the brake pad 5 or the carrier plate 10a on the brake carrier 7 (see also FIG. 7).

If both effects X), Y) causing the diagonal wear of the brake pads are to be reduced by reducing the active surface area of the friction lining 11a on the exit side A of the application-side brake pad 5, this reduction must be structured so as to vary with the thickness of the friction lining 11a for the part of the surface area reduction of the application-side friction lining 11 which counters the servo effect, and so as to be independent of the thickness of the friction lining 11a for the second part which compensates for the friction force effect or effect Y at the pad support.

Figure 8:
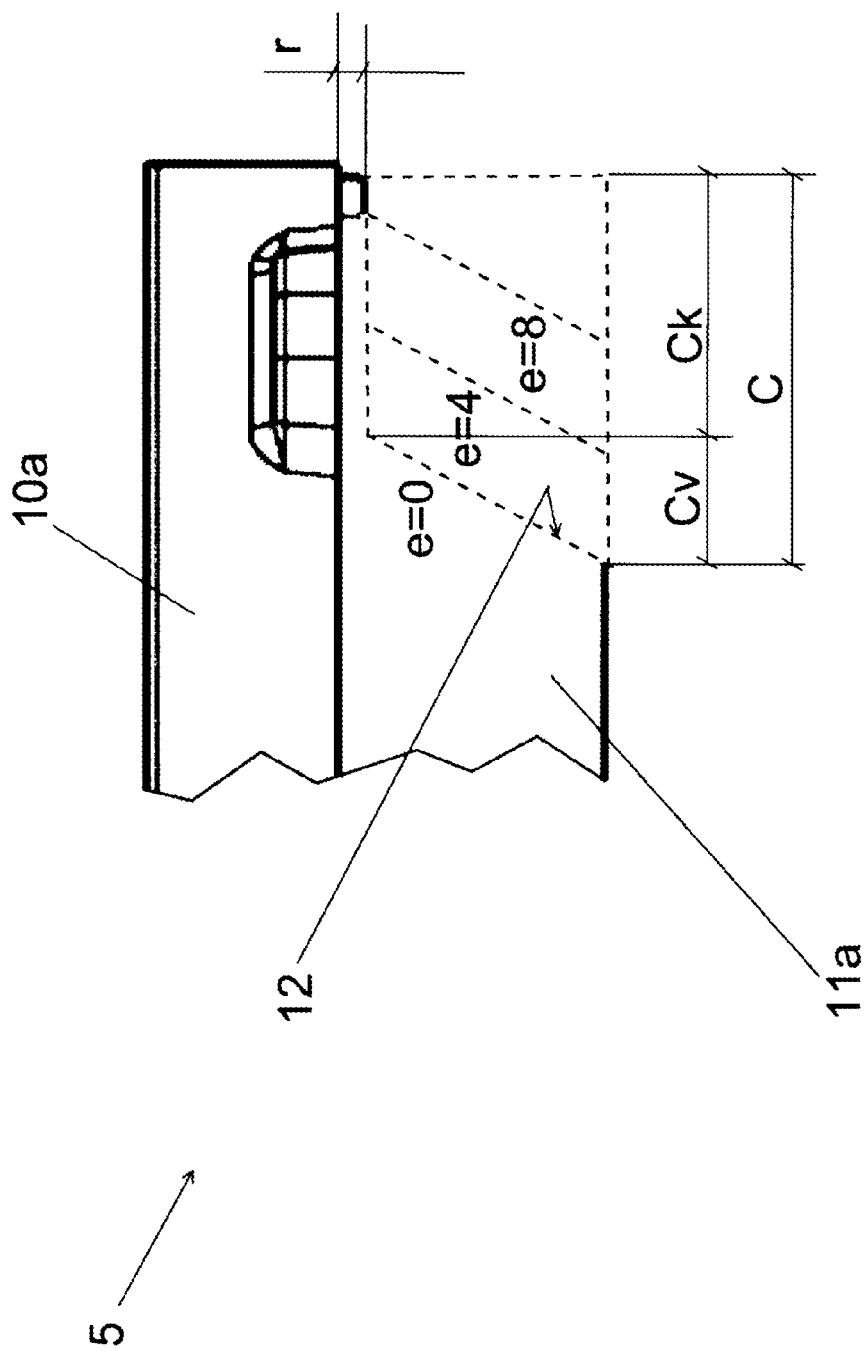
FIG. 8 an enlarged view of the exit side of the application-side brake pad from FIG. 3.

FIG. 8 shows such an adaptation of the active surface area of the friction lining 11a as an example.

FIG. 8 shows the exit-side half of the application-side brake pad 5 with the surface area adaptation described above. FIG. 8 shows a recess of the application-side friction lining 11a in the exit-side end region. The outer contour shown in dotted lines corresponds to the form of the friction lining 11a without an adaptation of the active surface area.

The chamfer or bevel 12 adjoining the recess C and marked e=0, and the straight line running parallel to the carrier plate 10a and marking the necessary residual thickness r of the friction lining 11a, correspond to the necessary change in friction lining geometry if both effects causing the diagonal wear of the brake pads are to be compensated by the geometry change of the friction lining 11a.

The recess C is divided into the region $C_V$ which is dependent on the thickness of the friction lining 11a, and the region of a constant recess $C_K$. The region $C_V$ of substantially smaller volume serves to compensate for the so-called servo effect or effect X), and the region $C_K$ compensates for the effect of the friction force of the carrier plate 10a on the brake carrier 7 (effect Y).

One disadvantage of compensating for diagonal wear of the brake pads by reducing the active surface area of the friction lining 11a on the exit side A of the application-side brake pad 5 is the loss of effective friction surface area and effective wear volume, which counters application of this method.

FIG. 8 and the example calculation of FIG. 7 shown below indicate that the recess $C_K$ necessary to compensate for the friction force proportion has approximately three times the volume of the recess $C_V$ compensating for the servo effect.

For this reason, it is advantageous to apply the method of active surface area reduction only to compensate for the servo effect (effect X) which is dependent on pad thickness, and to combine this with a second measure which is able to compensate for the friction force effect (effect Y) which is independent of the momentary thickness of the friction lining 11a.

It has been found that the method of center offset of the piston 8 or its pressure plate 9 to compensate for the friction force effect or effect Y) advantageously complements the method of active surface area reduction to compensate for the servo effect or effect X) which is dependent on pad thickness.

Insofar as the description below mentions the center offset of the piston 8, this means the distance of the action plane W of the piston 8 from the central plane S of the disc brake 1 which is caused by the offset of the centroid of the pressure plate 9 relative to the plane of symmetry of the piston 8.

The center offset of e.g. e=4 mm of the piston 8 reduces the size of the necessary recess $C_K$ by twice the amount, i.e. 8 mm. The center offset e of the piston 8 may be set within a relatively wide framework of dimensions depending on the existing geometric possibilities.

In addition, it is advantageous to use the center offset e only to reduce the size of the recess $C_K$ in order to keep both the necessary center offset e of the piston 8 and the size of the necessary bevel 12 of the friction lining 11a within reasonable limits.

With reference to FIG. 7 which shows the application-side brake pad 5 with the geometric conditions and the force application positions, a theoretical determination of the size of recess C and the geometric form of the recess C, and the proportions of the variable recess $C_V$ and the constant part $C_K$, are given below.

$H_{max}$=22.5 mm
$H_{min}$=6.5 mm
$F_K$=application force
$\mu_B$=0.375 (coefficient of friction between friction lining 11a and brake disc 4)
$\mu_S$=0.15 (coefficient of friction between carrier plate 10a and brake carrier 7)
e=center offset of piston 8
C/2=shift in centroid of friction lining 11
$L_B$=length of carrier plate 10
r=min. residual thickness of friction lining 11
Moment from servo effect: $M_S=F_K*\mu_B*H$
Friction moment: $M_R=F_U*\mu_S*L_B/2$
Circumferential force: $F_U=F_K*\mu_B$
Friction force: $F_R=F_U*\mu_S$
Correction moment: $M_K=F_K(e+C/2)$
Calculation of dimension C:

$$M_S \pm M_R - M_K = 0$$

$$F_K*\mu_B*H + F_K*\mu_B*\mu_S(L_B/2-e) - F_K(e+C/2) = 0$$

$$\mu_B*H + \mu_B*\mu_S(L_B/2-e) - (e+C/2) = 0$$

$$C = 2(\mu_B*H + \mu_B*\mu_S(L_B/2-e) - e)$$

Value table:

| e | C for $H_{max}$ | C for $H_{min}$ |
|---|---|---|
| 9 | 14.0625 | −0.1875 |
| 8 | 16.175 | 1.925 |
| 6 | 20.400 | 6.150 |
| 4 | 24.625 | 10.375 |
| 2 | 28.850 | 14.600 |
| 0 | 33.075 | 18.825 |

The amount for $C_{Vmax}$ results from the difference between the C values for $H_{max}$ and $H_{min}$, and is 14.25 mm for all values of the center offset of the piston 8 at maximum thickness of friction lining 11a (new brake pad 5).

$C_V$ reduces in proportion to the thickness of the friction lining 11a. The amount $C_K$ results from the difference of $$C-C_{Vmax}=18.825 \text{ mm}$$

and is dependent on thickness H, but in the presence of a center offset e of the piston 8 is reduced by twice the amount of the center offset e. For example, for a 6 mm center offset e, the value is $$C_K=18.825-12=6.825 \text{ mm}.$$

FIG. 8, FIG. 9 and in particular FIGS. 10A to 10D show the form of the recess for different amounts of center offset e of the piston 8. This form of recess, in each case paired with the corresponding center offset e of the piston 8, gives a diagonal wear with the value zero for the fundamental peripheral conditions for each wear state of the friction lining 11a.

The loss of friction lining wear volume without a center offset e of the piston 8 is 10.39%, and with a center offset of 9.4 mm of the piston 8, is approximately 2.5%.

For low values of the center offset e of the piston 8, due to the then necessary relatively large amounts for $C_K$ (e.g. for e=4 mm, $C_K$=10.375 mm) and because of the rebated form of the recess, there is a perceptible reduction in the active surface area of the friction lining 11.

Figure 10A:
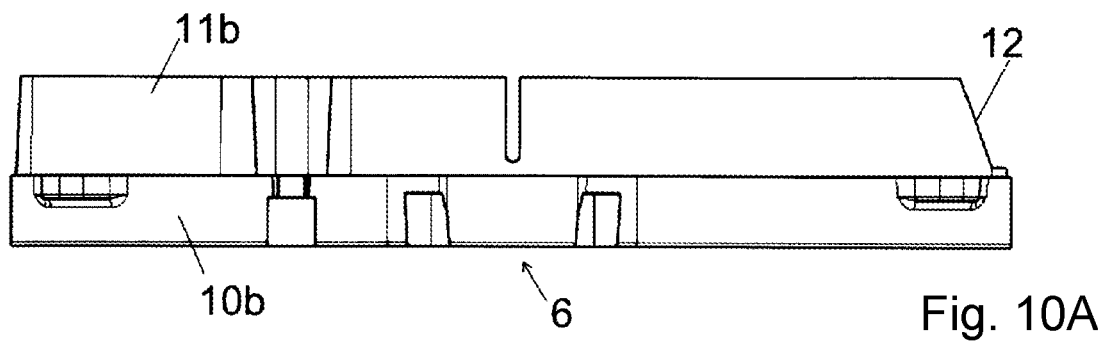
FIG. 10A a top view of an embodiment of the brake pad from FIG. 3.
Figure 10B:
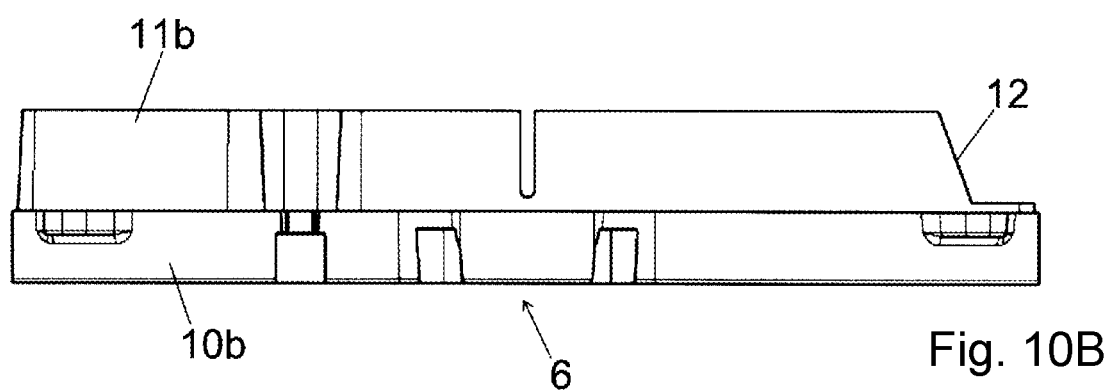
FIG. 10B a top view of a further embodiment of the brake pad from FIG. 3.
Figure 10C:
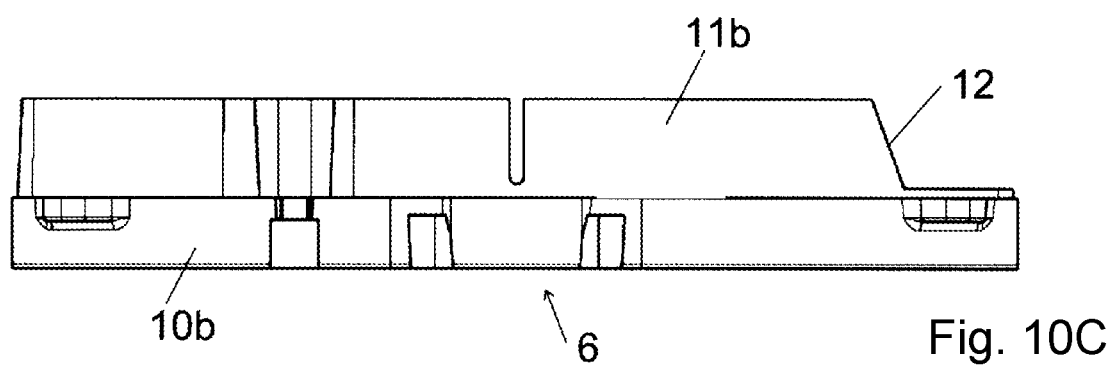
FIG. 10C a top view of a further embodiment of the brake pad from FIG. 3.
Figure 10D:
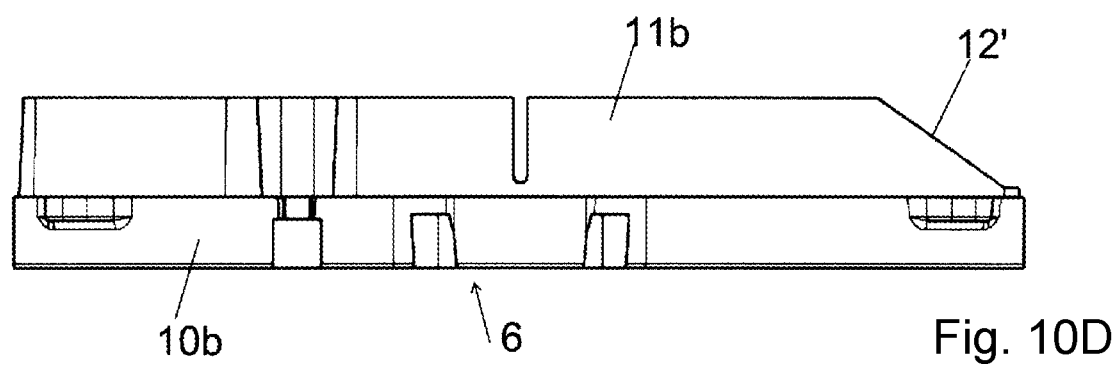
FIG. 10D a top view of a further embodiment of the brake pad from FIG. 3.

This disadvantage is avoided if the shape of the recess is selected in the form of the bevel 12' as shown in FIG. 9 and FIG. 10d. The bevel 12' is formed as a single exit-side bevel, marked in FIG. 9 and FIG. 10d as a solid line, which here runs at an angle alpha of 60° (see FIG. 5A for an definition of angle alpha), and is applied in combination with the center offset of e=4 mm of the piston 8. This dotted line intersects the chamfer assigned to the center offset e=4 mm of the piston 8 at approximately half thickness of the friction lining.

In other words, with a new brake pad 5, the diagonal wear tendency is initially slightly over-compensated. From half the friction lining thickness, this effect is reversed so that for a fully worn brake lining 11a, an even residual friction lining thickness r is achieved. In FIG. 9, these regions of over-compensation and under-compensation are illustrated as triangular areas $Ü_K$ and $U_K$ and the remaining residual friction lining thickness is r=2 mm.

By an optional geometric shaping of the bevel 12, 12' of the friction lining 11a which does not end at an edge of the carrier plate 10a but forms a region which represents the residual friction lining thickness r (see FIG. 7), also a wear indicator is achieved, which is advantageously visible from the outside and therefore easy to assess, for the application-side friction lining 11a and hence the brake pad 5.

The embodiment of the bevel 12' as a single exit bevel is simple to implement—which is advantageous for production—and makes the unavoidable loss of wear volume of around 5% visually less evident.

It is also advantageous if, in a further variant, the reaction-side brake pad 6 also contributes part of the compensation for diagonal wear of the brake pads 5, 6, and is therefore formed similarly to the application-side brake pad 5. Accordingly, the friction lining 11b of the reaction-side brake pad 6—preferably but not mandatorily—also has an exit-side bevel 12, 12' (not shown in FIGS. 1 and 2).

By dividing the measures for compensating for diagonal wear of the brake pads 5, 6 over several measures, it is achieved that each of these measures contributes only part of the necessary amount of compensation for diagonal wear. This advantageously guarantees that the cost of changing the components concerned to achieve complete compensation for diagonal wear of the brake pads remains low. Furthermore, for the application-side brake pad 5—optionally also for the reaction-side brake pad 6—advantageously this gives the minimum possible reduction in active surface area of the respective friction lining 11a due to the respective bevel 12, 12'.

The components which each contribute partly to the compensation for diagonal wear are the piston 8 by the center offset e of the pressure plate 9 relative to the plane of symmetry S of the disc brake 1, and/or the application-side brake pad 5 by a correspondingly dimensioned bevel 12, 12' of the friction lining 11a, the pad carrier plate 10a of the application-side brake pad 5, and—preferably but not mandatorily—the reaction-side brake pad 6, also by a correspondingly dimensioned bevel 12, 12' of the friction lining 11b.

Thus with little cost, a disc brake 1 can be created with a compact form and advantageously optimized behavior to compensate for diagonal wear of the brake pads 5, 6.

FIGS. 10A to 10D show as an overview variants of the bevel 12, 12' for different amounts of center offset e of the piston 8. For the technical conditions relating to the dimensioning of the bevel 12, 12', reference is made to FIGS. 8 and 9 and the description of these figures.

FIG. 10A shows the reaction-side brake pad 6 with a recess $C_K$ for a center offset of e=8 mm of the piston 8. For calculation of the recesses $C_K$ and $C_V$, reference is made to the detailed calculations in FIG. 7. The recess $C_V$ forms the bevel 12 at an angle alpha of preferably between 10° and 30°, particularly preferably between 15° and 25°.

FIG. 10B shows the reaction-side brake pad 6 with a recess $C_K$ for a center offset of e=4 mm of the piston 8. For calculation of the recesses $C_K$ and $C_V$, reference is made to the detailed calculations in FIG. 7. The recess $C_V$ forms the bevel 12 at an angle alpha of preferably between 10° and 30°, particularly preferably between 15° and 25°.

FIG. 10C shows the reaction-side brake pad 6 with a recess $C_K$ for a center offset of e=0 mm of the piston 8. For calculation of the recesses $C_K$ and $C_V$, reference is made to the detailed calculations in FIG. 7. The recess $C_V$ forms the bevel 12 at an angle alpha of preferably between 10° and 30°, particularly preferably between 15° and 25°.

FIG. 10D shows the reaction-side brake pad 6 with a recess $C_K$ for a center offset of e=4 mm of the piston 8. For calculation of the recesses $C_K$ and $C_V$, reference is made to the detailed calculations in FIG. 7. The recess $C_V$ and the recess $C_K$ form the bevel 12' which is configured such that it initially over-compensates for the servo effect (effect X) and then under-compensates as the friction lining 11b wears further (see also FIG. 9), at an angle alpha of preferably between 30° and 65°, particularly preferably between 50° and 65°.

The degree of over-compensation $Ü_K$ of the bevel 12' lies preferably between 70% and 30% above the nominal value of the servo moment $M_S$, particularly preferably between 45% and 55%. The degree of under-compensation $U_K$ of the bevel 12' lies preferably between 70% and 30% below the nominal value of the servo moment $M_S$, particularly preferably between 45% and 55%.

LIST OF REFERENCE SIGNS

1 Disc brake
2 Brake caliper
3 Housing
4 Brake disc
5 Brake pad
6 Brake pad
7 Brake carrier
8 Piston
9 Pressure plate
10 Carrier plate
11 Friction lining
12, 12' Bevel
13 Guide face
14a, b Shoulders
15 Guide bearing
16 Guide bearing
17a, b Recesses
19 Spring
20 Spring
21 Web
22 Retaining bracket
A Exit side
E Entry side
D Rotation direction
S Plane of symmetry
W Action plane
α Angle
$M_S$ Servo torque
$M_R$ Friction moment
$M_K$ Correction moment
$F_U$ Circumferential force
$F_K$ Application force
$F_R$ Friction force
H Lever arm
r Residual thickness
$L_B$ Length
e Center offset
$μ_S$ Coefficient of friction
$μ_B$ Coefficient of friction
C Recess
$C_{Vmax}$ Recess
$C_V$ Recess
$C_K$ Recess
$U_K$ Area
$Ü_K$ Area The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A disc brake for utility vehicles, comprising:
a brake disc;
a brake caliper spanning the brake disc;
a brake carrier arranged to support the brake caliper over the brake disc;
an application-side brake pad;
a reaction-side brake pad; and
an application device located in the brake caliper, the application device including a single piston configured to exert an application force on the application-side brake pad via a pressure plate,
wherein
at least the application-side brake pad is accommodated in a pad cavity of the brake carrier,
the brake caliper has a central plane parallel to a rotation axis of the brake disc, and an entry side and an exit side relative to a direction of rotation of the brake disc,
the disc brake is arranged with one or more of
an action plane of the pressure plate against the application-side brake pad being offset to the exit side at a distance from the central plane, and
at least the application-side brake pad has a bevel on an exit side,
the pressure plate has a geometry which is asymmetric relative to the central plane, and
the asymmetric pressure plate is oval-shaped.
2. The disc brake as claimed in claim 1, wherein the brake carrier is formed as a frame that spans the brake disc and receives the application-side brake pad and the reaction-side brake pad.
3. The disc brake as claimed in claim 1, wherein an entry-side shoulder of a carrier plate of the application-side brake pad engages in an entry-side recess of the brake carrier.
4. The disc brake as claimed in claim 1, wherein the pressure plate is integrally formed with the piston.
5. The disc brake as claimed in claim 1, wherein the piston is guided in the central plane of the disc brake.
6. The disc brake as claimed in claim 1, wherein at least a portion of the asymmetric pressure plate includes the action plane and offset relative to the central plane in the direction of the exit side.
7. The disc brake as claimed in claim 1, wherein the application-side brake pad and the reaction-side brake pad each include a carrier plate and a friction lining carried by the carrier plate.
8. The disc brake as claimed in claim 1, wherein the disc brake includes both of the action plane of the pressure plate being offset from the central plane toward the exit side and the bevel on the exit side of the application-side brake pad,
the friction lining includes the exit-side bevel, and
configured such that the exit-side bevel of the friction lining creates an asymmetric friction lining friction surface having a centroid offset toward the entry side of the central plane, such that the offset centroid of the friction lining friction surface and the offset pressure plate cooperate during brake application to generate a correction moment against the rotation direction of the brake disc counter to a servo moment generated by application of the friction lining against the brake disc.

9. The disc brake as claimed in claim 8, wherein
the bevel is configured such that when the friction lining is unworn, the amount of offset of the friction lining friction surface centroid over-compensates for the servo moment, and
during a wear life of the brake pad a diminishing thickness of the friction lining causes the friction lining friction surface centroid offset to decrease such that the amount of offset under-compensates for the servo moment.
10. The disc brake as claimed in claim 9, wherein
a degree of over-compensation is between 70% and 30% above the servo moment, and
a degree of under-compensation is preferably between 70% and 30% below the servo moment MS.
11. The disc brake as claimed in claim 9, wherein
a degree of over-compensation is between 55% and 45% above the servo moment, and
a degree of under-compensation is preferably between 55% and 450% below the servo moment MS.
12. The disc brake as claimed in claim 8, wherein
the bevel is configured such that a first part of the bevel at least partially compensates for the servo moment, and a second part at least partially compensates for an effect of friction force of the brake pad carrier plate on the brake carrier.
13. The disc brake as claimed in claim 1, wherein
a distance between the action plane and the central plane is between 0 mm and 10 mm.
14. The disc brake as claimed in claim 1, wherein
a distance between the action plane and the central plane is between 2 mm and 4 mm.
15. The disc brake as claimed in claim 14, wherein
the distance is dimensioned such the offset pressure plate reduces an amount of diagonal wear of the friction lining caused by a friction moment.
16. The disc brake as claimed in claim 8, wherein
the bevel of the friction lining meets the carrier plate at a distance spaced from an exit side of the backing plate corresponding to a residual friction lining thickness at which the brake pad is to be replaced.
17. The disc brake as claimed in claim 8, wherein
the bevel is at an angle relative to the friction lining friction surface of between 10° and 30°.
18. The disc brake as claimed in claim 8, wherein
the bevel is at an angle relative to the friction lining friction surface of between 15° and 25°.
19. The disc brake as claimed in claim 8, wherein
the bevel is at an angle relative to the friction lining friction surface of between 30° and 65°.
20. The disc brake as claimed in claim 8, wherein
the bevel is at an angle relative to the friction lining friction surface of between 50° and 65°.
21. A vehicle, comprising:
at least one disc brake, the disc brake including
a brake disc;
a brake caliper spanning the brake disc;
a brake carrier arranged to support the brake caliper over the brake disc;
an application-side brake pad;
a reaction-side brake pad; and
an application device located in the brake caliper, the application including a single piston configured to exerts an application force on the application-side brake pad via a pressure plate,
wherein
at least the application-side brake pad is accommodated in a pad cavity of the brake carrier, the brake caliper has a central plane parallel to a rotation axis of the brake disc, and an entry side and an exit side relative to a direction of rotation of the brake disc, the disc brake is arranged with one or more of
- an action plane of the pressure plate against the application-side brake pad being offset to the exit side at a distance from the central plane, and
- at least the application-side brake pad has a bevel on an exit side, the pressure plate has a geometry which is asymmetric relative to the central plane, and the asymmetric pressure plate is oval-shaped.

* * * * *